(No Model.)
W. CAMPBELL.
TIRE TIGHTENER.
No. 295,979. Patented Apr. 1, 1884.
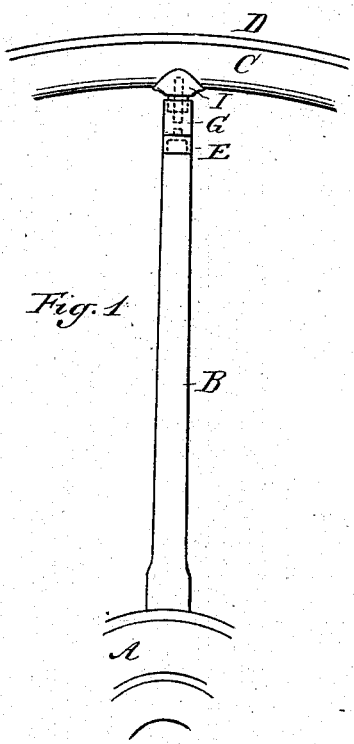
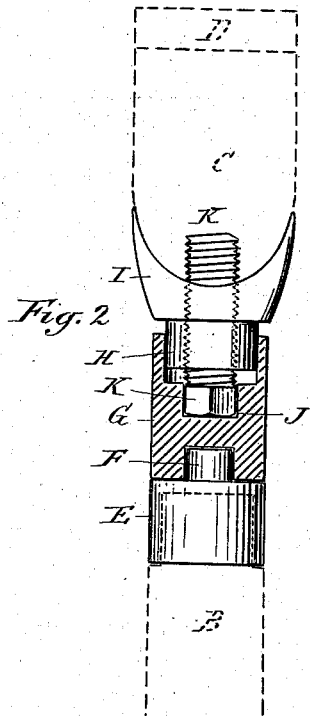
Attest:
A. Barthel
C. J. Hunt
Inventor:
Wm Campbell
by his Att'y Thos. S. Sprague

UNITED STATES PATENT OFFICE.

WILLIAM CAMPBELL, OF DETROIT, MICHIGAN.

TIRE-TIGHTENER.

SPECIFICATION forming part of Letters Patent No. 295,979, dated April 1, 1884.

Application filed August 27, 1883. (No model.)

*To all whom it may concern:*

Be it known that I, WILLIAM CAMPBELL, of Detroit, in the county of Wayne and State of Michigan, have invented new and useful Improvements in Tire-Expanders; and I do hereby declare that the following is a full, clear, and exact description thereof, reference being had to the accompanying drawings, which form a part of this specification.

The nature of this invention relates to certain new and useful improvements in devices for tightening tires. In wheeled vehicles, like wagons and carriages, it is a frequent source of annoyance and many times serious damage to find the tire becoming loose, owing generally to shrinking of the wooden parts of the wheel, and when this occurs proper care requires the resetting of the tire.

The object of the invention is to avoid the necessity of such resetting of the tire by providing means which will enable the shrinkage of the wooden parts to be overcome, and hold the tire tightly in place.

Figure 1 shows in perspective a section of a wheel, consisting of the hub, spokes, felly, and tire, with my device attached. Fig. 2 is a vertical central section through one of the spokes, rim, and tire.

In the accompanying drawings, which form a part of this specification, A represents the hub of the wheel, B the spoke, C the rim, and D the tire. The spoke and hub are secured together in the usual way; but, instead of the opposite end of the spoke being tenoned into the rim, it is fitted in a metallic cap, E. The under side of this cap has a central downwardly-projecting plug, F, which engages, when the parts are in place, in a socket of similar dimensions in an intermediate cap, G. The outer end of this latter-named cap has a socket to engage with the round shoulder H of the half-clip I, which is designed to embrace the inner edge of the felly. The socket in the cap G terminates in a square socket, J, which is designed to embrace the inner squared end of the screw K and form a wrench therefor. The intermediate cap is so constructed and operated that it rotates between the clip and cap E.

In practice the cap E is slipped onto the outer end of the spoke, and the clip I is set upon the inner face of the rim or felly in line with the spoke, and a hole is bored through the felly, or partially so, to allow the screw K to enter. The intermediate cap, G, is inserted, with its socket embracing the shoulder of the clip and the head of the screw, and its opposite end embracing the plug F upon the cap E. The intermediate cap is then turned in the proper direction to give motion to the screw, and all the spokes of the wheel being thus provided, the tension upon the rim and tire may be equalized at will, and whenever the latter becomes lessened, slightly turning all the intermediate caps in the same direction will tighten the tire equally upon all parts of the rim.

What I claim as my invention is—

The combination of the cap E, intermediate cap, G, clip I, and screw K, the parts being constructed and operating substantially as and for the purposes described.

WM. CAMPBELL.

Witnesses:
 H. S. SPRAGUE,
 E. SCULLY.